United States Patent
Hoshina et al.

(10) Patent No.: US 9,662,633 B2
(45) Date of Patent: May 30, 2017

(54) DESICCANT AND THE SAME DESICCANT-EMPLOYING ORGANIC EL ELEMENT

(71) Applicant: Futaba Corporation, Mobara-shi, Chiba (JP)

(72) Inventors: Yusuke Hoshina, Mobara (JP); Riki Kajiyama, Mobara (JP); Youhei Fujimura, Mobara (JP)

(73) Assignee: Futaba Corporation, Chiba (JP)

( * ) Notice: Subject to any disclaimer, the term of this patent is extended or adjusted under 35 U.S.C. 154(b) by 189 days.

(21) Appl. No.: 13/751,888

(22) Filed: Jan. 28, 2013

(65) Prior Publication Data

US 2013/0193842 A1 Aug. 1, 2013

(30) Foreign Application Priority Data

Jan. 31, 2012 (JP) .................................. 2012-019254
Dec. 14, 2012 (JP) .................................. 2012-273906

(51) Int. Cl.
*B01J 20/26* (2006.01)
*H05B 33/04* (2006.01)
(Continued)

(52) U.S. Cl.
CPC ............ *B01J 20/262* (2013.01); *B01D 53/28* (2013.01); *B01J 20/223* (2013.01); *H05B 33/04* (2013.01); *B01J 2220/44* (2013.01)

(58) Field of Classification Search
CPC .... B01J 20/262; B01J 20/223; B01J 2220/44; H05B 33/04; H05B 33/22; H05B 33/10; B01D 53/28

(Continued)

(56) References Cited

U.S. PATENT DOCUMENTS 6,656,609 B2 * 12/2003 Takahashi et al. ........... 428/690
6,790,381 B2    9/2004 Tsuruoka et al.
(Continued)

FOREIGN PATENT DOCUMENTS

CN    1418041 A    5/2003
CN  101683587 A    3/2010
(Continued)

OTHER PUBLICATIONS

Chinese Patent Office, First Office Action, CN 201310038739.7, Sep. 24, 2014, 15 pages.
(Continued)

*Primary Examiner* — Yan Lan
(74) *Attorney, Agent, or Firm* — Quarles & Brady LLP

(57) ABSTRACT

The invention relates to a desiccant suitable for being used with an organic EL element having a solid sealing structure. The desiccant is provided for suppressing any effect on an organic layer, and guaranteeing flowability while being filled. An organic EL element has a container, which includes an element substrate on which a laminate of a pair of electrodes and an organic layer located between the pair of electrodes is disposed, a sealing substrate spaced apart from the element substrate, a sealing agent disposed between the element substrate and the sealing substrate thereby hermetically sealing the container, and the desiccant disposed inside the container. In this configuration, the container is filled with the desiccant, and the laminate is thus surrounded by the desiccant. The desiccant is obtained by mixing a water-trapping agent with silicone. The water-trapping agent is present in an amount of 50-95% by weight and the silicone is present in an amount of 5-50% by weight based on the total weight of the desiccant.

2 Claims, 6 Drawing Sheets

(51) Int. Cl.
*B01J 20/22* (2006.01)
*B01D 53/28* (2006.01)

(58) Field of Classification Search
USPC .......... 428/35.7, 689, 690, 446, 68; 252/194
See application file for complete search history.

(56) References Cited

U.S. PATENT DOCUMENTS

| 8,771,545 B2 * | 7/2014 | Kim ..................... C07F 5/069 |
| | | 252/194 |
| 2009/0085480 A1 * | 4/2009 | Sakai et al. .................. 313/506 |
| 2011/0220877 A1 | 9/2011 | Morishima |

FOREIGN PATENT DOCUMENTS

| JP | 2003144830 A | | 5/2003 |
| TW | 504944 B | | 10/2002 |
| TW | 575654 B | | 2/2004 |
| WO | WO2012/002739 | * | 1/2012 |
| WO | 2012086334 A1 | | 6/2012 |

OTHER PUBLICATIONS

Taiwan Intellectual Property Office, Examination Report, TW 102103453, Sep. 25, 2014, 11 pages.

* cited by examiner

Fig.3

| silicone viscosity | Ratio of water-trapping agent in desiccant(water-trapping agent+silicone) | | | |
|---|---|---|---|---|
|  | 25wt% | 50wt% | 75wt% | 95wt% |
| 0.01 [Pa·s] | X | O | O | O |
| 0.1 [Pa·s] | X | X | O | O |
| 1 [Pa·s] | X | X | X | X |
| 10 [Pa·s] | X | X | X | X |
| 100 [Pa·s] | X | X | X | X |

O : translucent
X : cloudy

[ PRIOR ART ]

DESICCANT AND THE SAME DESICCANT-EMPLOYING ORGANIC EL ELEMENT

CROSS-REFERENCE TO RELATED APPLICATIONS

The present Application claims priority to Japanese Patent Application No. 2012-019254 filed on Jan. 31, 2012 and Japanese Patent Application No. 2012-273906 filed on Dec. 14, 2012, the entire disclosure of which is expressly incorporated herein by reference.

BACKGROUND OF THE INVENTION

The invention relates to a desiccant for absorbing a moisture present in a hermetically sealed container, in particular, a desiccant suited for being filled in the hermetically sealed container, and an the desiccant-employing organic electroluminescence element.

In recent years, organic EL (electroluminescence) element, organic light emitting system such as organic EL display and organic EL illumination, and organic electronic device such as organic semiconductor and organic solar battery have been widely studied and investigated, and is expected to be applied to a wide variety of basic elements and other use.

The organic EL element comprises an organic EL layer of a thin film containing a luminescent organic compound sandwiched between a pair of electrodes, a cathode and an anode. The organic EL element is a spontaneous light-emitting element in which a hole and an electron are injected into the thin film and recombined to generate an exiton and which utilizes emission of light (fluorescence/phosphorescence) when the exiton is inactivated.

The most significant problem of the above-described organic EL element is to improve its durability and, above all, generation of non-light emitting portion called "dark spot" and the prevention of its growth. When the diameter of the dark spot grows in tens of micrometers ($\mu$m), the non-light emitting portion can be confirmed by visual observation. A principal cause of the dark spot generation is the influence of water and oxygen, and particularly water, which has been known to influence the element most seriously even in a trace amount.

It is, therefore, necessary to prevent water from penetrating into the organic EL element, which is presently represented by a hollow sealing structure as disclosed in JP 2002-33187 A. In accordance with the hollow sealing structure, the penetration of moisture or oxygen into the organic EL element can be controlled or prevented by sealing the organic EL element under dry inert gas atmosphere.

With reference to FIG. 10, the hollow sealing structure of the organic EL element 10 includes an organic EL portion 12, which includes a translucent insulating element substrate 11, an anode disposed on the substrate, and an organic layer disposed on the anode, and a cathode disposed on the organic layer. A drying film 15 is placed as a drying means on a sealing substrate 13 in a container, which is hermetically sealed by the element substrate 11, the sealing substrate 13 and a sealing agent 14.

However, in the above hollow sealing structure, the drying means such as inorganic drying sheet should be disposed inside the container so as to chemically or physically absorb moisture therein. In this case, the space for disposing the drying means should be provided in the container, thereby increasing the cost for manufacture. In addition, it is difficult to render the thickness of the drying film as the drying means uniform. As a result, in a case of top-emission type organic EL element in which light generated in the organic EL portion is guided via the translucent sealing substrate toward outside, there occurs a problem of distortion of display.

Moreover, nothing is in contact with the upper surface of the cathode, and heat can only be emitted via radiation and convection across a panel. For the reason as set forth above, heat cannot be sufficiently radiated away from, for example, organic EL for illumination. Furthermore, in the organic EL element having a size above a certain level, flexibility is generated by pressing its center portion. A sealing substrate is brought in contact with the organic EL portion, thereby being likely to break the organic EL portion.

In view of the above, there has been suggested a solid sealing structure in which the organic layer is embedded and sealed in resin, thereby slowing the speed of penetrating moisture and oxygen. This structure is advantageous in heat release properties and panel strength. See JP H08-236271 A.

Referring to FIG. 11, an organic EL element 20 having the solid sealing structure includes an organic EL portion 22, which has a translucent insulating element substrate 21, an anode disposed on the element substrate 21, an organic layer disposed on the anode, and a cathode disposed on the organic layer. Subsequently, a protective layer 23 is disposed on the organic EL portion 22. Subsequently, a sealing layer 24 is formed, and a container is hermetically sealed by a sealing substrate 25, which is configured to protect the organic layer from ambient air, and a sealing agent 26. The protective layer 23 is configured to mitigate stress on the cathode during the formation of the sealing layer 24, as well as, to suppress the reaction of chemical components used in the sealing layer 24 with the organic layer, thereby preventing possible damage on the organic layer.

SUMMARY OF THE INVENTION

However, in the top emission-type solid sealing structure, it is difficult to arbitrarily dispose non-translucent sealing layer on the sealing substrate from which light is emitted. Moreover, there is needed an additional step in which a protective layer needed for forming the sealing layer is formed, thereby causing the increase of manufacture cost and time.

On the other hand, it has been considered that the interior of the container is filled with moisture-absorbing desiccant without forming the protective layer, thereby suppressing the generation of dark spot. However, the currently available translucent desiccant includes organic solvent therein so as to enhance handling properties and control viscosity. In a case where the desiccant without being dried is disposed between the sealing substrate and the element substrate and the circumference of the desiccant is sealed by the sealing agent such as non-translucent ultraviolet curing adhesives, the organic solvent included in the desiccant invades and then dissolves the organic layer. As a result, the durability of the organic EL element may be seriously deteriorated.

Also, in a case where a drying film, which is obtained by heating and drying the desiccant, is formed on the sealing substrate and the sealing substrate is coupled to the element substrate, the drying film is likely to harden, thereby causing physical disruption of the organic EL layer. Furthermore, the above desiccant has a tendency to cause a crack after it absorbs moisture. In this case, emitting light is subjected to irregular reflection, thereby decreasing transmission. As a result, such desiccant is not suitable for use in the top-emission type structure.

In order to overcome the above drawbacks and problems, there has been a strong desire for desiccant, which does not substantially affect the organic layer, and has a certain extent of flowability so as to prevent physical disruption of organic layer when the hermetically sealed container of organic EL element is filled with the desiccant.

In several aspects, the present invention provides the followings:

(1) A desiccant to be disposed in a hermetically sealed container, comprising
- as a water-trapping agent 50-95% by weight of an organometallic compound as illustrated by Formula 1 or polymer thereof based on a total weight of the desiccant, and
- 5-50% by weight of silicone as illustrated by Formula 2 based on the total weight of the desiccant,

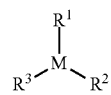
[Formula 1]

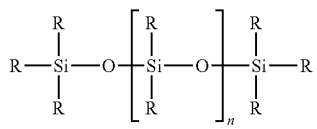
[Formula 2]

in Formula 1, $R^1$-$R^3$ represent an organic group including alkyl group, aryl group, alkoxy group, cycloalkyl group, heterocyclic group or acyl group having at least one carbon atom, M is a trivalent metal atom, and $R^1$-$R^3$ may be equal to or different from each other; and in Formula 2 R represents a substituent, n is an integer of at least one indicating degree of polymerization, and each of R may be equal to or different from each other.

(2) A desiccant to be disposed in a hermetically sealed container, comprising
- as a water-trapping agent 50-95% by weight of an organometallic compound having a unit structure as illustrated by Formula 3 based on a total weight of the desiccant, and
- 5-50% by weight of silicone as illustrated by Formula 2 based on the total weight of the desiccant,

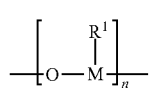
[Formula 3]

in Formula 3, $R^1$ represents an organic group including alkyl group, aryl group, alkoxy group, cycloalkyl group, heterocyclic group or acyl group having at least one carbon atom, M is a trivalent metal atom, n is an integer of at least one indicating degree of polymerization, and each of $R^1$ may be equal to or different from each other; and in Formula 2 R represents a substituent, n is an integer of at least one indicating degree of polymerization, and each of R may be equal to or different from each other.

(3) A desiccant to be disposed in a hermetically sealed container, comprising
- as a water-trapping agent 50-95% by weight of an organometallic compound as illustrated by Formula 4 based on a total weight of the desiccant, and
- 5-50% by weight of silicone as illustrated by Formula 2 based on the total weight of the desiccant,

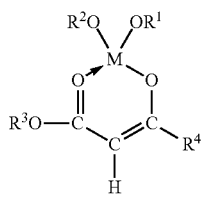
[Formula 4]

in Formula 4, $R^1$-$R^4$ represent an organic group including alkyl group, aryl group, alkoxy group, cycloalkyl group, heterocyclic group or acyl group having at least one carbon atom, M is a trivalent metal atom, n is an integer of at least one indicating degree of polymerization, and $R^1$-$R^4$ may be equal to or different from each other; and in Formula 2 R represents a substituent, n is an integer of at least one indicating degree of polymerization, and each of R may be equal to or different from each other.

(4) A desiccant to be disposed in a hermetically sealed container, comprising
- as a water-trapping agent 50-95% by weight of an organometallic compound as illustrated by Formula 5 or polymer thereof based on a total weight of the desiccant, and
- 5-50% by weight of silicone as illustrated by Formula 2 based on the total weight of the desiccant,

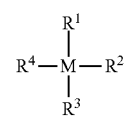
[Formula 5]

in Formula 5, $R^1$-$R^4$ represent an organic group including alkyl group, aryl group, alkoxy group, cycloalkyl group, heterocyclic group or acyl group having at least one carbon atom, M is a tetravalent metal atom, and $R^1$-$R^4$ may be equal to or different from each other; and in Formula 2 R represents a substituent, n is an integer of at least one indicating degree of polymerization, and each of R may be equal to or different from each other.

(5) A desiccant to be disposed in a hermetically sealed container, comprising
- as a water-trapping agent 50-95% by weight of an organometallic compound having a unit structure as illustrated by Formula 6 based on a total weight of the desiccant, and
- 5-50% by weight of silicone as illustrated by Formula 2 based on the total weight of the desiccant,

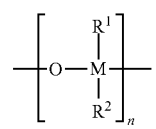
[Formula 6]

in Formula 6, $R^1$ and $R^2$ represent an organic group including alkyl group, aryl group, alkoxy group, cycloalkyl group, heterocyclic group or acyl group having at least one carbon atom, M is a tetravalent metal atom, n is an integer of at least one indicating degree of polymerization, and $R^1$ and $R^2$ may be equal to or different from each other; and in Formula 2 R represents a substituent, n is an integer of at least one indicating degree of polymerization, and each of R may be equal to or different from each other.

(6) A desiccant to be disposed in a hermetically sealed container, comprising
as a water-trapping agent 50-95% by weight of an organometallic compound as illustrated by Formula 7 based on a total weight of the desiccant, and
5-50% by weight of silicone as illustrated by Formula 2 based on the total weight of the desiccant,

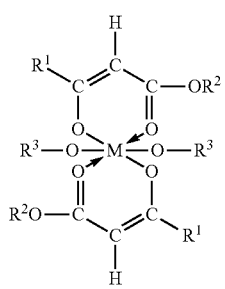

[Formula 7]

in Formula 1, $R^1$-$R^3$ represent an organic group including alkyl group, aryl group, alkoxy group, cycloalkyl group, heterocyclic group or acyl group having at least one carbon atom, M is a tetravalent metal atom, and $R^1$-$R^3$ may be equal to or different from each other; and in Formula 2 R represents a substituent, n is an integer of at least one indicating degree of polymerization, and each of R may be equal to or different from each other.

(7) An organic EL element having a container, the container comprising:
an element substrate on which a laminate of a pair of electrodes and an organic layer located between the pair of electrodes is disposed,
a sealing substrate spaced apart from the element substrate,
a sealing agent disposed between the element substrate and the sealing substrate thereby hermetically sealing the container, and
a desiccant as defined in any one of (1)-(6) disposed inside the container, wherein the container is filled with the desiccant, and the laminate is surrounded by the desiccant.

In accordance with the embodiment of the invention, the organic solvent is removed from the desiccant. Accordingly, the organic solvent is absent inside the organic EL element. As a result, there can be provided new desiccant, which, when used in the organic EL element, does not affect the organic layer.

In accordance with the embodiment of the invention, the desiccant has translucency, does not become cloudy, and does not create a crack even after it absorbs moisture. For the above reasons, the inventive desiccant can be used with the top emission-type structure in which light is emitted from the sealing substrate side. Furthermore, the desiccant being filled in the hermetically sealed container has a certain extent of viscosity. Accordingly, stress from outside can be mitigated, thereby preventing physical disruption of the organic layer.

BRIEF DESCRIPTION OF THE DRAWINGS

The invention may be put into practice in various ways and a number of embodiments will be described by way of example to illustrate the invention with reference to the accompanying drawings, in which.

Each of FIGS. 2A to 2D is a cross-sectional view showing a process for preparing an organic EL element of a solid sealing structure in accordance with an embodiment of the invention;

FIG. 3 is a table showing the compatibility (i.e., compatible state) between the silicone and water-trapping component.

Figure 4:
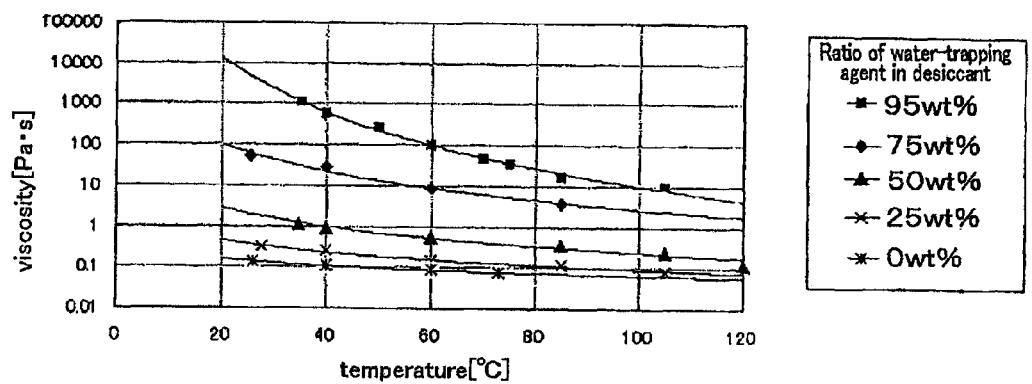
Figure 5:
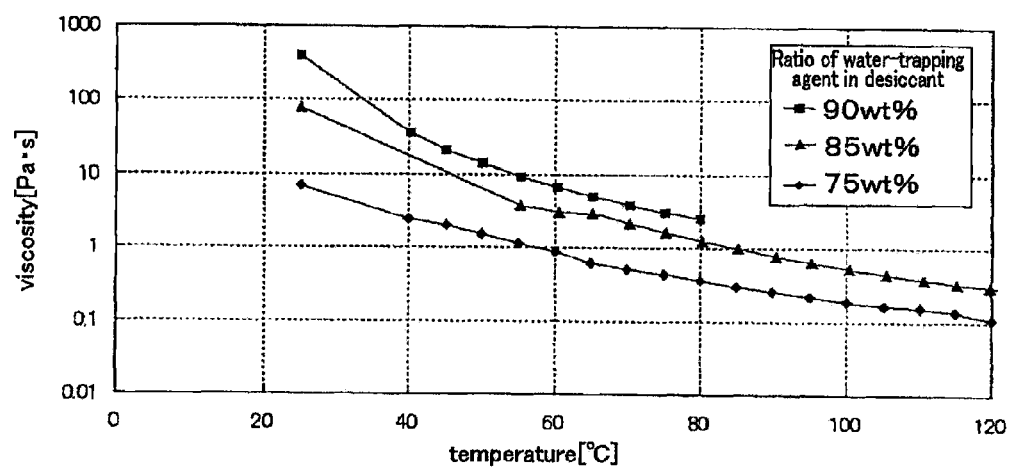
Figure 6:
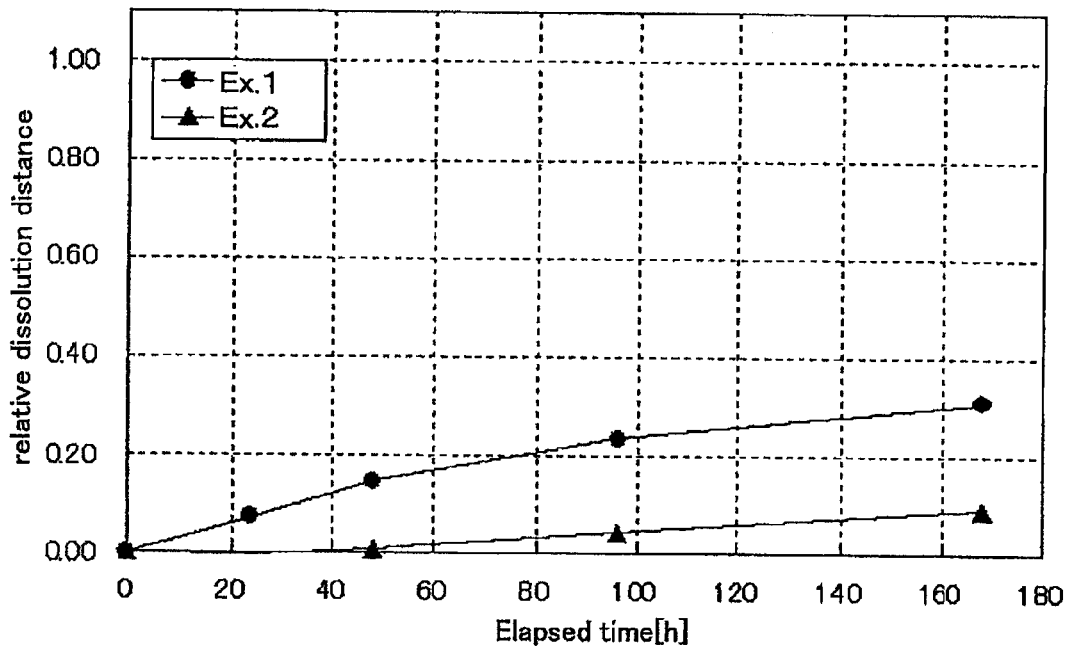
Figure 7:
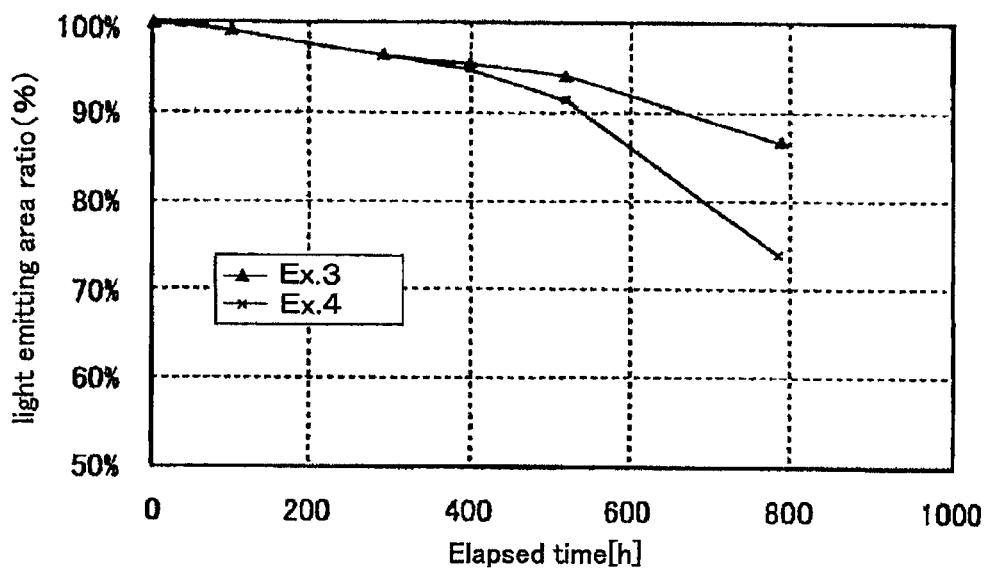
Figure 8:
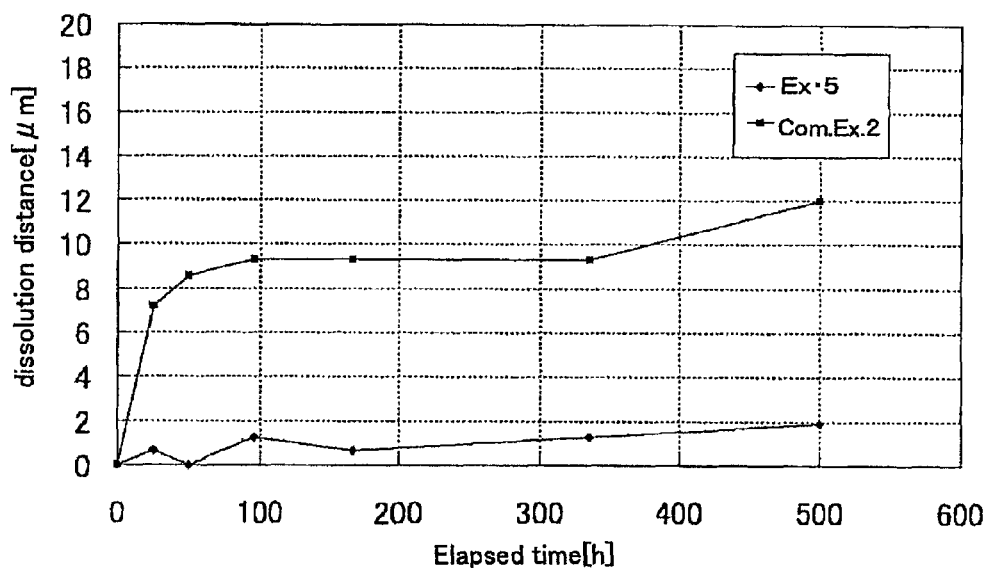
Figure 9:
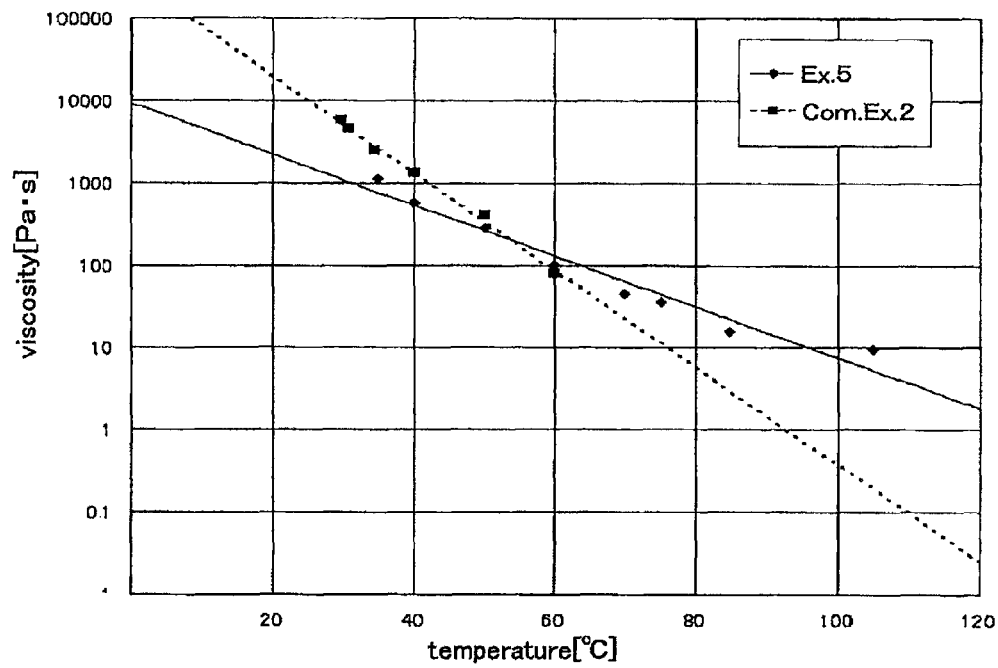
Figure 10:
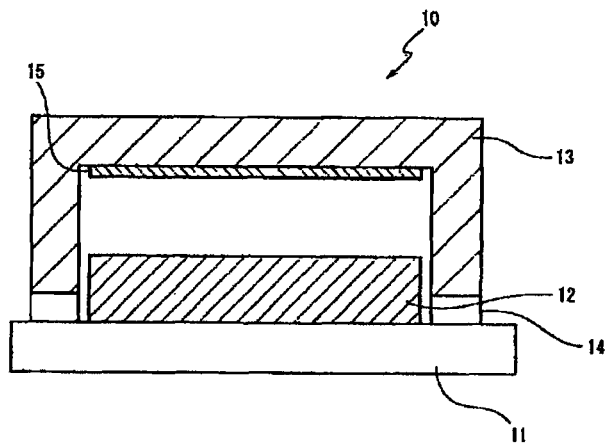
Figure 11:
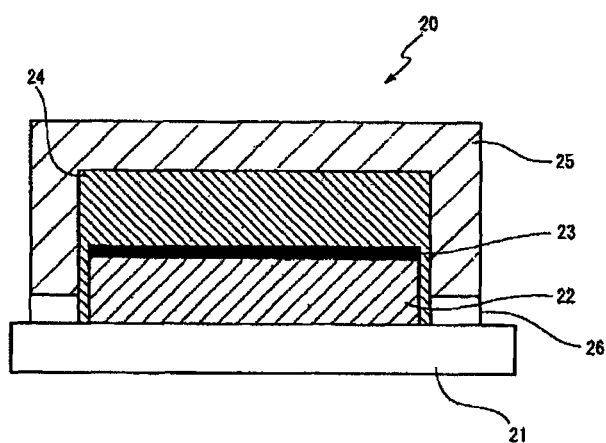

FIG. 4 is a graph showing the viscosity properties of desiccant, which is a combination of a water-trapping component and silicone;

FIG. 5 is a graph showing the viscosity of desiccant, which is a combination of a water-trapping component and silicone which is different from the silicone used in FIG. 4;

FIG. 6 is a graph showing the dissolution (i.e., dissolution variation) of organic layer;

FIG. 7 is a graph showing variation in light emitting area ratio (%) of an organic EL element over time elapsed, in which the organic EL element includes a desiccant in accordance with an embodiment of the invention;

FIG. 8 is a graph showing the dissolution (i.e., dissolution variation) of organic layer;

FIG. 9 is a graph showing the viscosity properties of desiccant in accordance with an embodiment of the invention;

FIG. 10 is a cross-sectional view of an organic EL element having a conventional hollow sealing structure; and FIG. 11 is a cross-sectional view of an organic EL element having a conventional solid sealing structure.

DETAILED DESCRIPTION OF THE PREFERRED EMBODIMENTS

A desiccant or drying agent in accordance with an embodiment of the invention can be employed in a wide variety of organoelectronic devices, including but not limited to, an organic EL display such as an organic EL element, an organic EL illumination, an organic semiconductor, or an organic solar battery, having a solid sealing structure in which a laminate of a pair of electrodes and an organic layer sandwiched between the pair of electrodes is hermetically sealed by an insulating element substrate and a sealing substrate. The sealing substrate is opposed to the element substrate, and is disposed apart from the element substrate. As such, moisture is efficiently absorbed, and dark spot generation can be thus remarkably suppressed.

Figure 1:
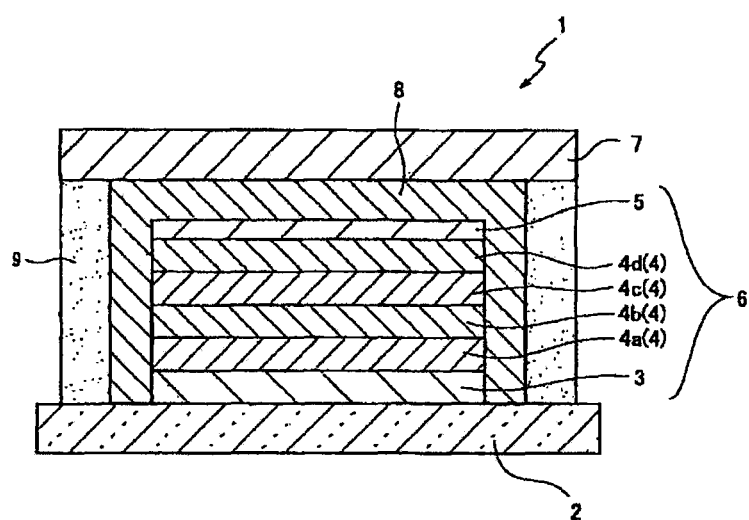
FIG. 1 is a cross-sectional view of an organic EL element having a solid sealing structure in accordance with an embodiment of the invention.

The configuration of organic EL element 1 having a solid sealing structure will be further explained with reference to FIGS. 1 and 2. Referring to FIG. 1, an organic EL element 1 having a solid sealing structure comprises as a base an element substrate 2 formed of a rectangle-shaped insulating and translucent glass substrate. With reference to FIG. 1, the anode 3 of indium tin oxide (i.e., ITO) layer is formed as a transparent conductive material on the upper surface of the element substrate 2. The ITO layer is formed on the upper surface of the element substrate 2 by, for example, PVD (Physical Vapor Deposition method) such as a vacuum deposition method, sputtering method, or the like. Then, a given pattern is applied on the layer by etching by means of photoresist method so as to form the anode 3. A part of the anode 3 is pulled out to the end of the element substrate 2 and connected to a driving circuit (not shown).

The organic layer 4 is formed on the upper surface of the anode 3 by PVD method such as molecular beam deposition method, resistive heating method, or the like. With reference to FIG. 1, the organic layer 4 is shown to include four layers of a copper phthalocyanine (CuPc) layer 4a as a hole injection layer formed on the upper surface of the anode 5 in the thickness of about tens of nanometers, a Bis[(N-(1-naphtyl)-n-phenyl]benzidine (α-NPD) layer 4b as a hole transport layer formed on the upper surface of the hole injection layer 4a in the thickness of about tens of nanometers, a tris(8-quinolinolat)aluminum (Alq3) layer 4c as a light-emitting layer formed on the upper surface of the hole transport layer 4b in the thickness of about tens of nanometers, and a lithium fluoride (LiF) layer 4d as an electron transport layer formed on the upper surface of the light-emitting layer 4c in the thickness of several nanometers.

As shown in FIG. 1, the cathode 5 is formed on the upper surface of the organic layer 4 (i.e., the electron transport layer 4d) as a thin metallic layer. The material for the thin metallic layer includes, but is not limited to, a simple metal material of small working function such as Al, Li, Mg, In, or the like, and an alloy of small working function such as Al—Li alloy, Mg—Ag alloy, or the like. The cathode 5 is formed in the thickness of, for example from several tens nanometers to several hundred nanometers, preferably from 50 nm to 200 nm. A part of the cathode 5 is pulled out to the end of the element substrate 2, and connected to a driving circuit (not shown).

Figure 2A:

With reference to FIG. 2A, an organic EL portion includes a laminate 6 consisting of the anode 3, the organic layer 4, and the cathode 5, and is formed on the element substrate 2. In accordance with the embodiment of the invention, the organic layer is made four-layered structure. However, the organic layer in accordance with the invention is not limited to such four-layered structure.

Figure 2B:
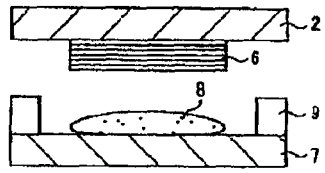

With reference to FIG. 2B, the desiccant 8 is weighted in advance, and is applied onto the sealing substrate 7 in a predetermined amount by means of a dispenser. Subsequently, a sealing agent 9 such as ultraviolet curing resin is disposed such that the desiccant 8 applied onto the sealing substrate 7 is surrounded.

Figure 2C:
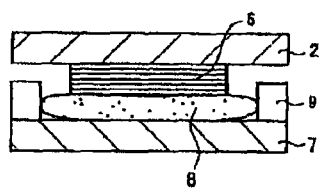
Figure 2D:
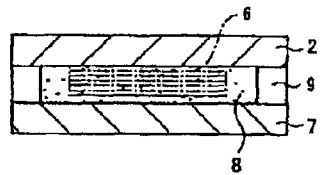

With reference to FIG. 2C, the element substrate 2 on which the laminate 6 of the anode, the organic layer, and the cathode is formed, and the sealing substrate 7 in which the desiccant is applied and sealing agent are disposed are coupled together, and then sealed. As a result, as shown in FIG. 2D and FIG. 1, the organic EL element 1 having a solid sealing structure is obtained. In this structure, the interior of the hermetically sealed container is filed with the desiccant 8.

Alternatively, the desiccant 8 can be applied and filled in accordance with one drip fill method (i.e., ODF method) rather than the afore-mentioned dispenser method. In the case of ODF method, the element substrate and the sealing substrate are coupled together in a vacuum. However, other applying and filling technologies or manners can be also employed.

A water-trapping agent (or water-trapping component) and silicone included in the desiccant in accordance with the embodiment of the invention will be described in detail.

[Water-Trapping Agent]

The water-trapping agent is a component for absorbing water or moisture used in the desiccant or drying agent in accordance with the embodiment of the invention. The water-trapping agent is an organometallic compound having a unit structure as illustrated by Formula 3 in which each $R^1$ represents an organic group, which includes alkyl group, aryl group, alkoxy group, cycloalkyl group, heterocyclic group or acyl group having at least one carbon atom, M is a trivalent metal atom, and n represents an integer of at least one indicating the degree of polymerization. Each of $R^1$ may be equal to or different from each other.

In a case where n is 3 in the above organometallic compound as illustrated by the Formula 3, cyclic structure as illustrated by the following Formula 8 in which each of $R^1$-$R^3$ independently represents an organic group including alkyl group, aryl group, alkoxy group, cycloalkyl group, heterocyclic group or acyl group having at least one carbon atom, and M is a trivalent metal atom can be obtained.

A reaction of the compound illustrated by Formula 8 with water is provided in the following Formula 9. As shown in Formula 9, the compound illustrated by Formula 8 provokes addition reaction with water molecule, thereby absorbing or capturing moisture. As such, the organometallic compound as illustrated by Formula 8 can chemically eliminate moisture.

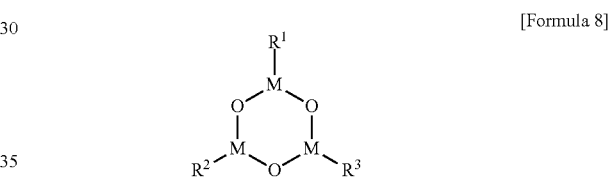

[Formula 8]

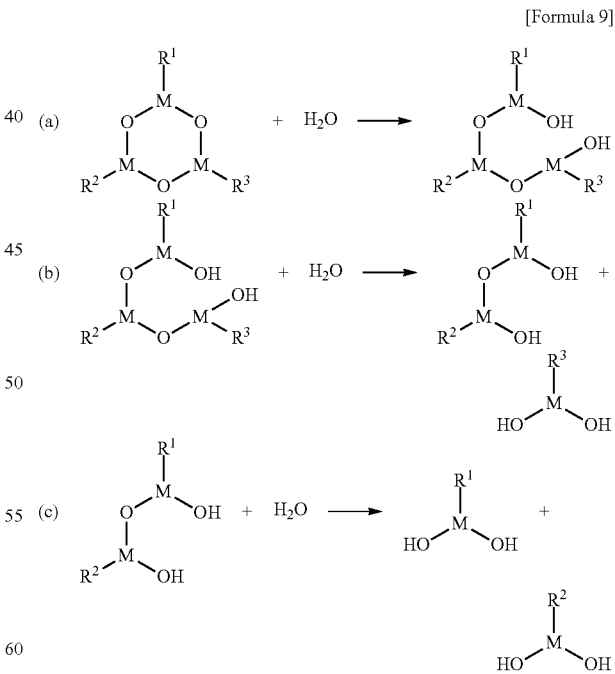

[Formula 9]

The organometallic compound having the unit structure as illustrated by Formula 3 may be linear. In this case, the organometallic compound having the unit structure as illustrated by Formula 3 can be represented by Formula 10. In Formula 10, each of $R^1$-$R^3$ independently represents an organic group including alkyl group, aryl group, alkoxy group, cycloalkyl group, heterocyclic group or acyl group having at least one carbon atom, M is a trivalent metal atom, and n is an integer of at least one indicating the degree of polymerization. Each of $R^1$ may be equal to or different from each other. Furthermore, the definition of $R^2$ and $R^3$ is equal to the definition of $R^1$ of Formula 3.

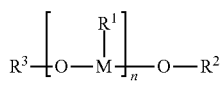

Formula 10

The organometallic compound as illustrated by Formula 10 absorbs moisture via addition reaction with water molecule.

The organic group of $R^1$ in Formula 3 may include, but is not limited to, the following groups. $R^1$ represents alkyl group, alkenyl, aryl group, alkoxy group, cycloalkyl group, heterocyclic group or acyl group having at least one carbon atom.

Alkyl group may be substituted or unsubstituted, and may be exemplified by a methyl group, ethyl group, propyl group, butyl group, sec-butyl group, tert-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group, heneicosyl group, docosyl group, or the like and is preferably those having one to twelve carbon atoms. In addition, oligomer or polymer thereof may be also used.

Alkenyl group may be substituted or unsubstituted, and may be exemplified by vinyl group, allyl group, butenyl group, pentenyl group, hexenyl group or the like. Preferably, alkenyl group has one to twelve carbon atoms. The oligomer or polymer thereof may be also used.

Aryl group may be substituted or non-substituted, and may be exemplified by a phenyl group, tolyl group, 4-cyanophenyl group, biphenyl group, o,m,p-terphenyl group, naphthyl group, anthryl group, phenanthrenyl group, fluorenyl group, 9-phenylanthryl group, 9,10-diphenylanthryl group, pyrenyl group, or the like. Aryl group may be preferably those having one to twelve carbon atoms. The oligomer or polymer thereof may be used.

Alkoxy group may be substituted or unsubstituted, and may be exemplified by methoxy group, ethoxy group, isopropyl group, n-butoxy group, tert-butoxy group, sec-butoxy group, trichloromethoxy group, trifluoromethoxy group, or the like. Alkoxy group may be preferably those having one to twelve carbon atoms. The oligomer or polymer thereof may be used.

Cycloalkyl group may be substituted or unsubstituted, and may be exemplified by cyclopentyl group, cyclohexyl group, norbornane group, adamantane group, 4-methylcyclohexyl group, 4-cyanocyclohexyl group or the like. Cycloalkyl group may be preferably those having one to twelve carbon atoms. The oligomer or polymer thereof may be used.

Heterocyclic group may be substituted or unsubstituted, and may be exemplified by pyrrole group, pyrroline group, pyrazole group, pyrazoline group, imidazole group, triazole group, pyridine group, pyridazine group, pyrimidine group, pyrazine group, triazine group, indole group, benzimidazole group, purine group, quinoline group, isoquinoline group, cinorin group, quinoxaline group, benzquinoline group, fluorenone group, dicyanofluorenone group, carbazole group, oxazole group, oxadiazole group, thiazole group, thiadiazole group, benzoxazole group, benzothiazole group, benzotriazole group, bisbenzooxazole group, bisbenzothiazole group, bisbenzoimidazole group or the like. Heterocyclic group may be preferably those having one to twelve carbon atoms. The oligomer or polymer thereof may be used.

Acyl group may be substituted or unsubstituted, and may be exemplified by formyl group, acetyl group, propionyl group, butyryl group, isobutyryl group, valeryl group, isovaleryl group, pivaloyl group, lauroyl group, myristoyl group, palmitoyl group, stearoyl group, oxalyl group, malonyl group, succinyl group, glutaryl group, adipoyl group, pimeloyl group, suberoyl group, azelaoyl group, sebacoyl group, acryloyl group, propioloyl group, methacryloyl group, crotonoyl group, isocrotonoyl group, oleoyl group, elaidoyl group, maleoyl group, fumaroyl group, citraconoyl group, mesaconoyl group, camphoroyl group, benzoyl group, phthaloyl group, isophthaloyl group, telephthaloyl group, naphthoyl group, toluoyl group, hydroatropoyl group, atropoyl group, cinnamoyl group, furoyl group, thenoyl group, nicotynoyl group, isonicotynoyl group, glycoloyl group, lactoyl group, glyceroyl group, tartronoyl group, maloyl group, tartharoyl group, tropoyl group, benziloyl group, salicyloyl group, anisoyl group, vaniloyl group, veratroyl group, piperonyloyl group, protocatechoyl group, galloyl group, glyoxyloyl group, pyruvoyl group, acetoacetyl group, meso-oxalyl group, meso-oxalo group, oxalacetyl group, oxalaeto group, levulinoyl group, or the like. These acyl groups may be substituted with fluorine, chlorine, bromine, iodine or the like. The number of carbon atoms of the acyl group may be preferably one to twelve. The oligomer or polymer thereof may be used.

Examples of the organometallic compound as illustrated by Formula 3 in which Rt is afore-mentioned organic group, trivalent metal is aluminum, and n is 3 are cyclic structure as illustrated by Formula 11 to 18 below.

[Formula 11]

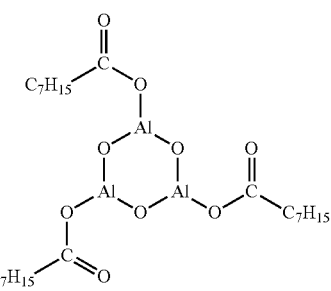

[Formula 12]

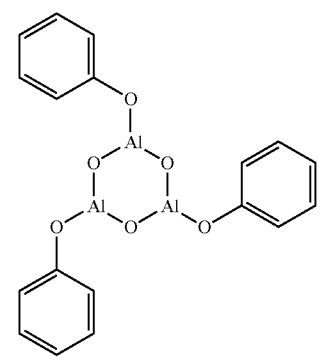

[Formula 13]

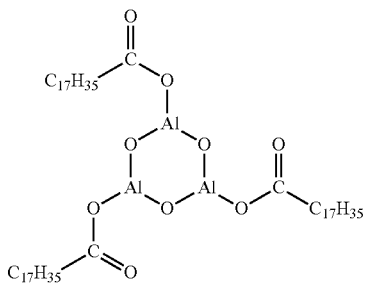

[Formula 14]

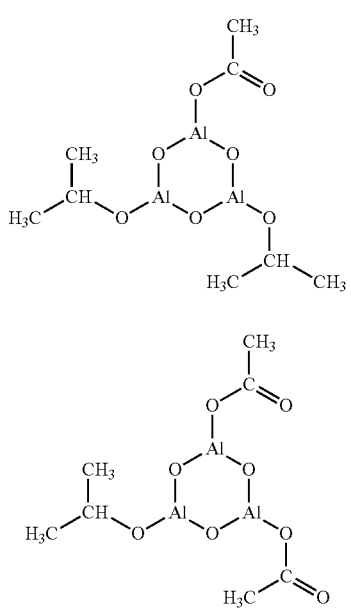

[Formula 15]

[Formula 16]

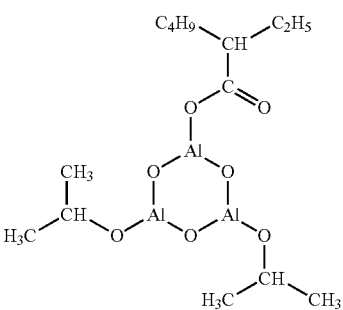

[Formula 17]

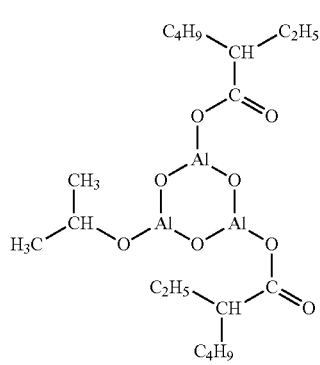

[Formula 18]

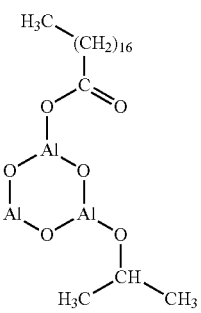

The organometallic compounds as illustrated by Formula 1 also absorb or capture moisture via addition reaction with water molecule.

In Formula 1, the definition of $R^1$-$R^3$ is equal to the definition of $R^1$ of Formula 3, and trivalent metal is aluminum. The exemplary organometallic compound, which can be used as the water-trapping agent, includes, for example, aluminum methoxide, aluminum ethoxide, aluminum propoxide, aluminum-n-butoxide, aluminum-sec-butoxide, aluminum-tert-butoxide, aluminum-n-octoxide, or aluminum-n-dodecoxide.

Furthermore, in Formula 1 the definition of $R^1$-$R^3$ is equal to the definition of R of Formula 3, and trivalent metal is boron. The exemplary organometallic compound, which can be used as the water-trapping agent, includes, for example, trimethoxyborane, triethoxyborane, triisopropoxyborane, tri-n-butoxyborane, tri-sec-butoxyborane, tri-tert-butoxyborane, tri-n-octoxyborane, or tri-n-dodecoxyborane.

Furthermore, the organometallic compound as illustrated by Formula 4 performs substitution reaction with water molecule, thereby absorbing or capturing water, as represented by Formula 19 below.

[Formula 19]

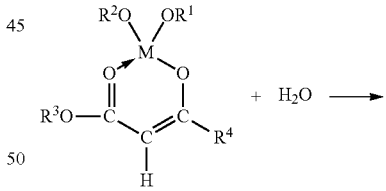

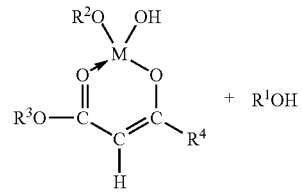

Examples of the organic group of $R^1$-$R^4$ in Formula 4 are described below, but are not limited thereto. Each of $R^1$-$R^4$ represents an organic group including alkyl group, aryl group, alkoxy group, cycloalkyl group, heterocyclic group, or acyl group which has at least one carbon atom, M is a trivalent metal atom, and n is an integer of at least one indicating the degree of polymerization. Each of $R^1$-$R^4$ is equal to or different from each other.

Alkyl group may be substituted or unsubstituted, and may be exemplified by a methyl group, ethyl group, propyl group, butyl group, sec-butyl group, tert-butyl, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group, heneicosyl group, docosyl group, or the like, preferably those having one to twelve atoms. The oligomer or polymer thereof may be also used.

Alkenyl group may be substituted or unsubstituted, and may be exemplified by a vinyl group, allyl group, butenyl group, pentenyl group, hexenyl group, or the like, preferably those having one to twelve carbons. The oligomer or polymer thereof may be also used.

Aryl group may be substituted or unsubstituted, and may be exemplified by a phenyl group, tolyl group, 4-cyanophenyl group, biphenyl group, o,m,p-terphenyl group, naphthyl group, anthryl group, phenanthrenyl group, fluorenyl group, 9-phenylanthryl group, 9,10-diphenylanthryl group, pyrenyl group or the like, preferably those having one to twelve atoms. The oligomer or polymer thereof may be used.

Alkoxy group may be substituted or unsubstituted, and may be exemplified by methoxy group, ethoxy group, isopropoxy group, n-butoxy group, sec-butoxy group, tert-butoxy group, trichloromethoxy group, trifluoromethoxy group or the like, preferably those having one to twelve carbons. The oligomer or polymer thereof may be used.

Cycloalkyl group may be substituted or unsubstituted, and may be exemplified by a cyclopentyl group, cyclohexyl group, norbornane group, adamantane group, 4-methylcyclohexyl group, 4-cyanocyclohexyl group or the like, preferably those having one to twelve atoms. The oligomer or polymer thereof may be used.

Heterocyclic group may be substituted or unsubstituted, and may be exemplified by a pyrrole group, pyrroline group, pyrazole group, pyrazoline group, imidazole group, triazole group, pyridine group, pyridazine group, pyrimidine group, pyrazine group, triazine group, indole group, benzimidazole group, purine group, quinoline group, isoquinoline group, cinorin group, quinoxaline group, benzquinoline group, fluorenone group, dicyanofluorenone group, carbazole group, oxazole group, oxadiazole group, thiazole group, thiadiazole group, benzoxazole group, benzothiazole group, benzotriazole group, bisbenzooxazole group, bisbenzothiazole group, bisbenzoimidazole group, or the like, preferably those having one to twelve atoms. The oligomer or polymer thereof may be used.

Acyl group may be substituted or unsubstituted, and may be exemplified by formyl group, acetyl group, propionyl group, butyryl group, isobutyryl group, valeryl group, isovaleryl group, pivaloyl group, lauroyl group, myristoyl group, palmitoyl group, stearoyl group, oxalyl group, malonyl group, succinyl group, glutaryl group, adipoyl group, pimeloyl group, suberoyl group, azelaoyl group, sebacoyl group, acryloyl group, propioloyl group, methacryloyl group, crotonoyl group, isocrotonoyl group, oleoyl group, elaidoyl group, maleoyl group, fumaroyl group, citraconoyl group, mesaconoyl group, camphoroyl group, benzoyl group, phthaloyl group, isophthaloyl group, telephthaloyl group, naphthoyl group, toluoyl group, hydroatropoyl group, atropoyl group, cinnamoyl group, furoyl group, thenoyl group, nicotynoyl group, isonicotynoyl group, glycoloyl group, lactoyl group, glyceroyl group, tartronoyl group, maloyl group, tartharoyl group, tropoyl group, benziloyl group, salicyloyl group, anisoyl group, vaniloyl group, veratroyl group, piperonyloyl group, orotocatechoyl group, galloyl group, glyoxyloyl group, pyruvoyl group, acetoacetyl group, meso-oxalyl group, meso-oxalo group, oxalacetyl group, oxalaceto group, levulinoyl group or the like, preferably those having one to twelve atoms. These acyl groups may be substituted with fluorine, chlorine, bromine, iodine or the like. The oligomer or polymer thereof may be used.

Examples of the organometallic compound of Formula 4 in which $R^1$-$R^4$ are defined as stated previously, and trivalent metal is aluminum are organometallic compounds as illustrated by Formula 20-23 below.

[Formula 20]

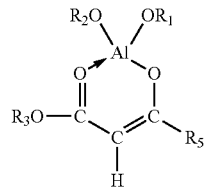

[Formula 21]

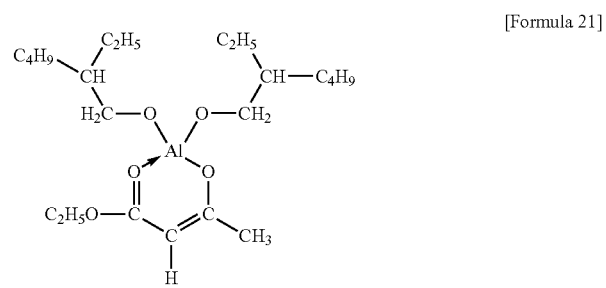

Aluminium-di-2-ethylhexyloxide-mono-Ehtyl aceto acetate Chelope-EH-2

-continued

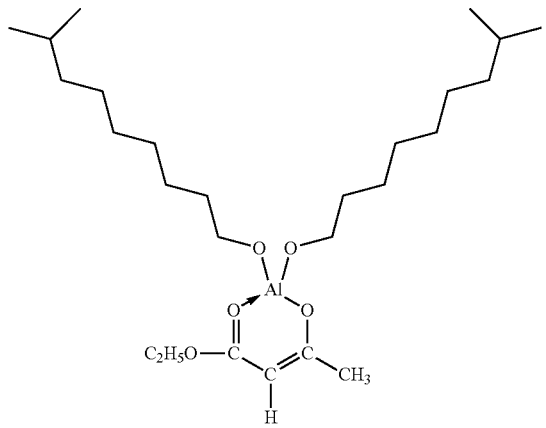

Aluminium-di-2-methylnonyloxide-mono-Ehtyl aceto acetate Chelope C10-2

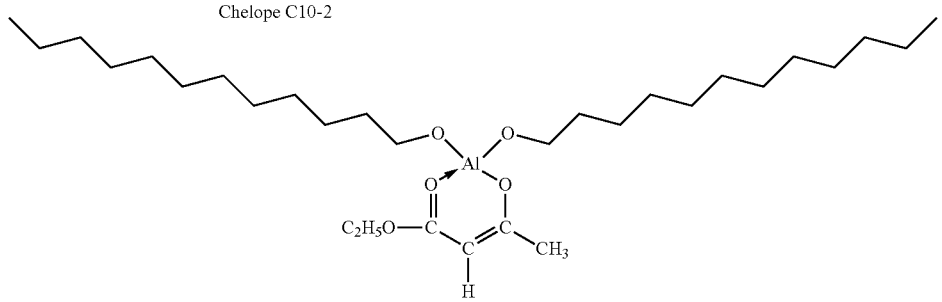

Aluminium-di-n-lauriloxide-mono-Ehtyl aceto acetate Chelope C12-2

Examples of the organometallic compound of Formula 4 in which $R^1$-$R^4$ are defined as stated previously, and trivalent metal is lanthanum are organometallic compounds as illustrated by Formula 24 below.

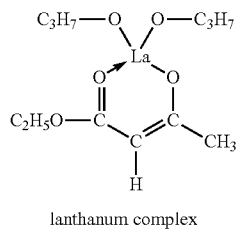

lanthanum complex

Examples of the organometallic compound of Formula 4 in which $R^1$-$R^4$ are defined as stated previously, and trivalent metal is yttrium are organometallic compounds as illustrated by Formula 25 below.

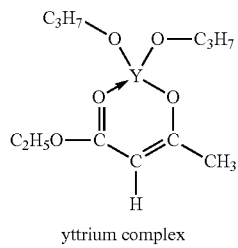

yttrium complex

Examples of the organometallic compound of Formula 4 in which $R^1$-$R^4$ are defined as stated previously, and trivalent metal is gallium are organometallic compound as illustrated by Formula 26 below.

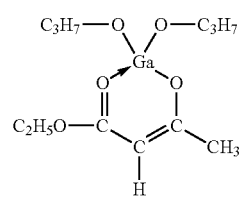

gallium complex

The organometallic compound as illustrated by Formula 6 performs addition reaction with water molecule thereby absorbing or capturing moisture in the same manner as the organometallic compound as illustrated by Formula 3 acts. Such addition reaction is represented by Formula 9 above.

The organometallic compound as illustrated by Formula 7 performs substitution reaction with water molecule thereby absorbing or capturing moisture in the same manner as the organometallic compound as illustrated by Formula 4 acts. Such substitution reaction is represented by Formula 19 above.

Exemplary $R^1$-$R^2$ of Formula 6 and $R^1$-$R^3$ of Formula 7 may be an organic group such as alkyl group, alkenyl group, aryl group, alkoxy group, cycloalkyl group, heterocyclic group, and acyl group having at least one carbon atom, but are not limited thereto. M represents tetravalent metal atom.

Alkyl group may be substituted or unsubstituted, and may be exemplified by a methyl group, ethyl group, propyl group, butyl group, sec-butyl group, tert-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group, heneicosyl group, docosyl group, or the like, preferably those having one to twelve atoms. The oligomer or polymer thereof may be also used.

Alkenyl group may be substituted or unsubstituted, and may be exemplified by a vinyl group, allyl group, butenyl group, pentenyl group, hexenyl group, or the like, preferably those having one to twelve carbons. The oligomer or polymer thereof may be also used.

Aryl group may be substituted or unsubstituted, and may be exemplified by a phenyl group, tolyl group, 4-cyanophenyl group, biphenyl group, o,m,p-terphenyl group, naphthyl group, anthryl group, phenanthrenyl group, fluorenyl group, 9-phenylanthryl group, 9,10-diphenylanthryl group, pyrenyl group or the like, preferably those having one to twelve atoms. The oligomer or polymer thereof may be used.

Alkoxy group may be substituted or unsubstituted, and may be exemplified by methoxy group, ethoxy group, isopropoxy group, n-butoxy group, sec-butoxy group, tert-butoxy group, trichloromethoxy group, trifluoromethoxy group or the like, and is preferably those having one to twelve carbons. The oligomer or polymer thereof may be used.

Cycloalkyl group may be substituted or unsubstituted, and may be exemplified by a cyclopentyl group, cyclohexyl group, norbornane group, adamantane group, 4-methylcyclohexyl group, 4-cyanocyclohexyl group or the like, preferably those having one to twelve atoms. The oligomer or polymer thereof may be used.

Heterocyclic group may be substituted or unsubstituted, and may be exemplified by a pyrrole group, pyrroline group, pyrazole group, pyrazoline group, imidazole group, triazole group, pyridine group, pyridazine group, pyrimidine group, pyrazine group, triazine group, indole group, benzimidazole group, purine group, quinoline group, isoquinoline group, cinorin group, quinoxaline group, benzquinoline group, fluorenone group, dicyanofluorenone group, carbazole group, oxazole group, oxadiazole group, thiazole group, thiadiazole group, benzoxazole group, benzothiazole group, benzotriazole group, bisbenzooxazole group, bisbenzothiazole group, bisbenzoimidazole group, or the like, preferably those having one to twelve atoms. The oligomer or polymer thereof may be used.

Acyl group may be substituted or unsubstituted, and may be exemplified by formyl group, acetyl group, propionyl group, butyryl group, isobutyryl group, valeryl group, isovaleryl group, pivaloyl group, lauroyl group, myristoyl group, palmitoyl group, stearoyl group, oxalyl group, malonyl group, succinyl group, glutaryl group, adipoyl group, pimeloyl group, suberoyl group, azelaoyl group, sebacoyl group, acryloyl group, propioloyl group, methacryloyl group, crotonoyl group, isocrotonoyl group, oleoyl group, elaidoyl group, maleoyl group, fumaroyl group, citraconoyl group, mesaconoyl group, camphoroyl group, benzoyl group, phthaloyl group, isophthaloyl group, telephthaloyl group, naphthoyl group, toluoyl group, hydroatropoyl group, atropoyl group, cinnamoyl group, furoyl group, thenoyl group, nicotynoyl group, isonicotynoyl group, glycoloyl group, lactoyl group, glyceroyl group, tartronoyl group, maloyl group, tartharoyl group, tropoyl group, benziloyl group, salicyloyl group, anisoyl group, vaniloyl group, veratroyl group, piperonyloyl group, orotocatechoyl group, galloyl group, glyoxyloyl group, pyruvoyl group, acetoacetyl group, meso-oxalyl group, meso-oxalo group, oxalacetyl group, oxalaceto group, levulinoyl group or the like, preferably those having one to twelve atoms. These acyl groups may be substituted with fluorine, chlorine, bromine, iodine or the like. The oligomer or polymer thereof may be used.

In Formula 5, the definition of $R^1$-$R^4$ is equal to the definition of $R^1$ and $R^2$ of Formula 6, and the definition of $R^1$-$R^3$ of Formula 7, and tetravalent metal is titanium. The exemplary organometallic compound, which can be used as the water-trapping agent, includes titanium methoxide, titanium ethoxide, titanium propoxide, titanium-n-butoxide, titanium-sec-butoxide, titanium-tert-butoxide, titanium-n-octoxide, or titanium-n-dodecoxide.

Moreover, in Formula 5 the definition of $R^1$-$R^4$ is equal to the definition of R of Formula 6 and the definition of $R^1$-$R^3$ of Formula 7, and tetravalent metal is silicon. The exemplary organometallic compound, which can be used as the water-trapping agent, includes tetramethoxysilane, tetraethoxysilane, tetraisopropoxysilane, tetra-n-butoxysilane, tetra-sec-butoxysilane, tetra-tert-butoxysilane, tetra-n-octoxysilane, or tetra-n-dodecoxysilane.

Examples of the organometallic compound of Formula 7 in which $R^1$-$R^3$ are defined as stated previously, and tetravalent metal are germanium are organometallic compounds as illustrated by Formula 27 and 28 below.

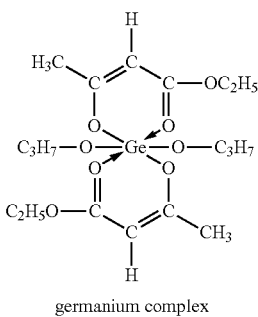

[Formula 27]

germanium complex

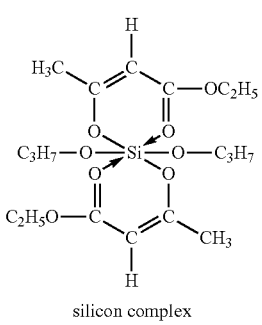

[Formula 28]

silicon complex

Moreover, because the compound materials as illustrated by Formula 1, 3-7 are dissolved in aromatic organic solvent such as toluene and xylene, or aliphatic organic solvent such as n-decane, a general desiccant including a physical adsorption-based desiccant such as zeolites, or a chemical adsorption-based desiccant such as calcium oxide, strontium oxide, and barium oxide can be also dispersed in the above organic solvent.

[Silicone]

Silicone to be mixed with the water-trapping agent is a general name of polysiloxane, which is a polymer with a backbone of a siloxane bonding and is represented by Formula 2. In Formula 2, n is an integer of one or more indicating the degree of polymerization, and R is a substituent (group). Each R may be equal to or different from each other. It had been known that silicone has properties in dependence on the degree of polymerization, and can be present as an oil (i.e., liquid) or a rubber (i.e., solid). Specific examples of the silicone include dimethyl silicone in which all of substituents (R) are methyl groups. The dimethyl silicone can be illustrated by Formula 29. In Formula 29, n represents an integer of at least one, indicating the degree of polymerization.

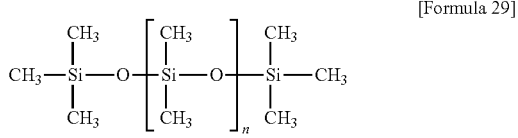

[Formula 29]

Furthermore, silicone in which a part of methyl groups in dimethyl silicone is substituted with phenyl group is methyl phenyl silicone. In addition, silicone in which a part of methyl groups in dimethyl silicone is substituted with hydrogen is methyl hydrogen silicone.

Dimethyl silicone, methyl phenyl silicone, and methyl hydrogen silicone can be called as a straight silicone. Silicone in which methyl group, and/or phenyl group, and/or hydrogen is substituted by other organic group can be called as a modified silicone.

Exemplary organic group R (i.e., substituent) may include, but are not limited to, in addition to methyl group, phenyl group, or hydrogen as mentioned previously, long chain alkyl group, phenyl alkyl group, fluorine-substituted alkyl group, aminoalkyl group, epoxy group-containing alkyl group, carboxyl group, hydrogen-containing alkyl group or the like. Also, higher fatty acid ester or polyether may be introduced.

An exemplary silicone may include alkyl-modified silicone, aralkyl-modified silicone, polyether-modified silicone, higher fatty acid-modified silicone, fluorine-substituted alkyl-modified silicone, amino-modified silicone, epoxy-modified silicone, carboxyl-modified silicone, or alcohol-modified silicone, in dependence on the substituting organic group used.

To determine optimized conditions for mixing the water-trapping agent with silicone in accordance with the invention, we have carried out the study using a dimethyl silicone TSF451 series, which are available from Momentive Performance Materials Japan Limited Liability Company.

It is desirable for the silicone to be compatible with the water-trapping agent after mixing with the water-trapping agent, to be translucent, and have a viscosity suited for being filled in the hermetically sealed container. FIG. 3 is a table showing a compatible state of desiccants which were obtained by mixing the water-trapping agent with several silicones, which are different in viscosity at ambient temperature (25 Celsius degrees). In table, "o" means that translucency is maintained, and "x" means that the desiccant become cloudy. From these results, although the viscosity of silicone at ambient temperature is related, the ratio of water-trapping agent is preferably 50-95% by weight of total weight of the desiccant, and the ratio of silicone is preferably 5-50% by weight of total weight of the desiccant.

In addition, FIG. 4 shows the relationship between temperature and viscosity in the desiccants which are respectively obtained by mixing the silicone having a viscosity of 0.1 Pa·s at ambient temperature and the water-trapping agent at several different mixing ratios.

FIG. 5 shows the relationship between temperature and viscosity in the desiccants which are respectively obtained by mixing the silicone having a viscosity of 0.01 Pas at ambient temperature and the water-trapping agent at several different mixing ratios.

It is desirable for the desiccant to have a viscosity at ambient temperature of no less than 1 Pa·s and no greater than 5000 Pa's when the desiccant is applied in accordance with a dispenser method thereby being filled in the hermetically sealed container. Preferably, the desiccant has a viscosity at ambient temperature of no less than 1 Pa·s and no greater than 300 Pa·s for the dispenser method. It is desirable for the desiccant to have a viscosity at ambient temperature of no less than 0.03 Pa·s and no greater than 1 Pa·s when the desiccant is applied in accordance with ODF method. Preferably, the desiccant has a viscosity at ambient temperature of no less than 0.1 Pa·s and no greater than 1 Pa·s for ODF method. Furthermore, the desiccant has a viscosity at ambient temperature of no greater than 0.03 Pa·s when the desiccant is applied in accordance with an inkjet method.

It may be possible to lower the viscosity of the desiccant by greater amount of silicone having lower viscosity at ambient temperature with less amount of water-trapping agent. In this case, the performance of the desiccant to absorb moisture inside the hermetically sealed container is however deteriorated. The mixing ratio can be determined by specific application of organic EL element to which the desiccant is applied. For example, organic EL element for a display needs greater ratio or content of water-trapping agent due to remarkably harmful effects induced by dark spot generation. To the contrary, in the case of organic EL element for illumination, the less ratio or content of water-trapping agent may be possible.

In view of the above, the ratio of the water-trapping agent to the total weight of the desiccant is 50-95% by weight, and the ratio of the silicone to the total weight of the desiccant is 5-50% by weight.

Next, a method for preparing the desiccant in accordance with the invention, and a method for manufacturing organic EL element, which employs the desiccant, will be hereinafter described in detail. However, the invention is not limited to the method as described below. One skilled in the art would appreciate that the invention can be modified or changed within the spirit of the invention.

Example 1

Method for the Preparation of Desiccant

Aluminum oxide octylate, which is the organometallic compound having water-trapping properties, as illustrated by Formula 3 in which M is aluminum, was dissolved in organic solvent, and was employed as a first component. Such first component was obtained from Hope Chemical Co. Ltd. under the name of OLEEP AOO. Silicone (dimethyl silicone TSF 451-100 available from Momentive Performance Materials Japan Limited Liability Company) was employed as a second component. The first and second components were weighted such that the organic aluminum compound was 50% by weight and the silicone was 50% by weight, and in turn mixed in a round-bottom flask with stirring. Subsequently, the organic solvent was removed by heating under a reduced pressure, thereby obtaining a desiccant.

Method for Manufacturing Organic EL Element

With reference to FIGS. 1 and 2, the method for manufacturing organic EL element will be described in detail. First, as shown in FIG. 2A, an anode 3 of ITO film of 140 nm in thickness was formed as a transparent conductive material on an element substrate 2 by sputtering method. Thereafter, patterning was carried out in a given pattern by etching in accordance with photoresist method to form the anode 3. A part of ITO was pulled out to the end of the element substrate 2 and connected to a driving circuit (not shown).

On the upper surface of the anode 3 were formed the copper phthalocyanine (CuPc) layer 4a as a hole injection layer 4a in the thickness of 70 nm in accordance with resistive heating method. Bis[(N-(1-naphthyl)-N-phenyl]benzidine (α-NPD) layer as a hole transport layer 4b was formed on the upper surface of the layer 4a in the thickness of 30 nm. Tris (8-quinolinolat) aluminum (Alq3) layer as a light-emitting layer 4c was formed on the upper surface of the layer 4b in the thickness of 50 nm.

Subsequently, on the upper surface of the organic layer 4c a layer of lithium fluoride (LiF) of 7 nm in thickness was formed as an electron transport layer 4d. Aluminum of 150 nm in thickness was formed as a cathode 5 in accordance with physical deposition method. A part of the cathode 5 was pulled out to the end of the element substrate 2 and connected to a driving circuit (not shown).

Subsequently, in a nitrogen (dew point of −76° C. or below)-substituted glove box, the desiccant 8 as prepared previously was weighted and applied in an appropriated amount onto the sealing substrate 7 by a dispenser. Next, a sealing agent 9, which was formed of ultraviolet curing resin, was applied by a dispenser such that the desiccant applied onto the sealing substrate 7 was surrounded.

With reference to FIG. 2C, the element substrate 2 on which the anode 3, the organic layer 4, and the cathode 5 were layered and the sealing substrate 7 were coupled or attached together, and then sealed by ultraviolet irradiation and heating at 80 Celsius degrees. As such, the organic EL element 1 having a solid sealing structure in which the desiccant 8 is filled in the hermetically sealed container, as shown in FIGS. 1 and 2D was obtained.

In the case of the solid sealing structure, less processing is needed for the element substrate in comparison with the hollow sealing structure. As a result, the size of element can be increased. Furthermore, because the inside of the solid sealing structure is filled with the desiccant, the solid sealing structure shows enhanced shock resistance, as well as, enhanced heat release properties in comparison with the hollow sealing structure.

Example 2

Example 2 was equal to Example 1 excluding that the organic aluminum compound was used in an amount of 95% by weight and the silicone was used in an amount of 5% by weight based on the total weight of the desiccant which was formed of the aluminum compound and the silicone.

Comparative Example 1

Comparative Example 1 was equal to Example 1 excluding that that the desiccant was replaced with OLEEP AOO available from Hope Chemical Co. Ltd.

Comparison Result 1

The organic EL element of Comparative Example 1 was held at the temperature of 105 Celsius degrees, and then any change in the organic layer was observed. FIG. 6 shows the relative dissolution distance values of Example 1 and Example 2 given that the dissolution distance of the organic layer of Comparative Example 1 organic EL element was considered a value of "1".

FIG. 6 demonstrates that the dissolution distances of Example 1 and Example 2 are very short, and the solubility was also very low. When comparing Example 1 and Example 2, Example 2 was found to be more advantageous in terms of dissolution of organic layer.

Example 3

Example 3 was prepared by using carboxyl-modified silicone X-22-3701 E available from Shin-Etsu Chemical Co. Ltd as the silicone. For reference, carboxyl-modified silicone is one of modified silicone. The same organic aluminum compound as used in Example 1 and the modified silicone were weighted such that the organic aluminum compound was 90% by weight and the modified silicone was 10% by weight based on the total weight of desiccant, and then mixed in a round-bottom flask with stirring. Subsequently, the organic solvent was removed by heating under a reduced pressure thereby obtaining a desiccant of Example 3.

Others were the same as in Example 1.

Example 4

Example 4 was prepared by using carboxyl-modified silicone X-22-162C available from Shin-Etsu Chemical Co. Ltd. as the silicone. For reference, the carboxyl-modified silicone X-22-162C was one of modified silicone. Others were the same as in Example 3.

Comparison Result 2

With respect to the growth of dark spot, the organic EL elements of Example 3 and Example 4 was observed by microscope under high temperature and humidity storage test condition. For more detail, the temperature was 85 Celsius degrees and humidity was 85%.

The organic EL elements of Example 3 and Example 4 were found to maintain light emitting area of equal to or more than 75% of the emitting dot even after a period of time of 780 hours had elapsed, as shown in FIG. 7.

Example 5

Desiccant of Example 5 was prepared by using the same organic aluminum compound as used in Example 1, and dimethyl silicone TSF 451-10 available from Momentive Performance Materials Japan Limited Liability Company. The organic aluminum compound was used in an amount of 95% by weight and the silicone was used in an amount of 5% by weight based on the total weight of the desiccant. Others were the same as in Example 1.

Comparative Example 2

Comparative Example 2 was prepared by replacing the silicone of the desiccant of Example 5 with polybutene. Others were the same as in Example 5.

Comparison Result 3

The organic EL elements of Example 5 and Comparative Example 2 were held at the temperature of 105 Celsius degrees, and then any change in the organic layer was observed. FIG. 8 shows the relationship between the dissolution distance of the organic EL layer and the elapsed time. The organic EL element of Example 5 has less dissolution distance in comparison with the dissolution distance of Comparative Example 2. This indicates that the silicone is less likely to affect the organic layer as compared with polybutene.

The inventors have investigated the effect of solvent to be mixed with the water-trapping agent on the organic layer by using the concept of solubility parameter. The solubility parameter is obtained given that the dissolution is considered a dissociation of solute aggregation, and assuming that only intermolecular force acts between the solute and solvent in the solution. Specifically, the solubility parameter is defined by a square root of aggregation energy density, and can be determined from evaporative latent heat needed for evaporation of 1 cubic centimeter liquid. Moreover, it has been known that materials having similar solubility parameters show better compatibility therewith.

The calculated solubility parameter value of the water-trapping agent was about 10. When the solubility parameters of main organic EL element materials were calculated, the organic EL element materials often had the value of approximately "11". As such, the material that has solubility parameter being apart from that of organic EL element and approximating that of water-trapping agent can be a candidate. In particular, the inventors have investigated the material having a solubility parameter less than that of the water-trapping agent as a new solvent. It was considered that silicone and polybutene could be preferably used as a new solvent substituting organic solvent in terms of the aforementioned solubility parameter and handling.

Furthermore, it has been known that among the material having the same solubility parameter the material having less flowability is less likely to affect the organic layer. FIG. 9 shows temperature-versus-viscosity properties of Example 5 and Comparative Example 2. With reference to FIG. 9, Example 5 has less temperature dependency of viscosity than Comparative Example 2. In other words, Example 5 has flowability that is insusceptible to temperature condition in comparison with Comparative Example 2, thereby being capable of being suitably used with the desiccant.

Example 6

Example 6 was prepared by using metal alkoxide as the water-trapping agent of the desiccant used in Example 1. Others were the same as in Example 1. Exemplary metal alkoxide may include, but is not limited to, aluminum methoxide, aluminum ethoxide, aluminum isopropoxide, aluminum-n-butoxide, aluminum-sec-butoxide, aluminum-tert-butoxide, aluminum-n-octoxide, aluminum-n-dodecoxide, trimethoxyborane, triethoxy borane, triisopropoxyborane, tri-n-butoxyborane, tri-sec-butoxyborane, tri-tert-butoxyborane, tri-n-octoxyborane, tri-n-dodexyborane, titanium methoxide, titanium ethoxide, titanium isopropoxide, titanium-n-butoxide, titanium-sec-butoxide, titanium-tert-butoxide, titanium-n-octoxide, titanium-n-dodecoxide, tetramethoxysilane, tetraethoxysilane, tetraisopropoxysilane, tetra-n-butoxysilane, tetra-sec-butoxysilane, tetra-tert-butoxysilane, tetra-n-octoxysilane, tetra-n-dodecoxysilane or the like.

Furthermore, metal alkoxide in a liquid state can be employed so as to make it easier to mix with the silicone. As such, it is possible to easily obtain the desiccant of any viscosity.

Example 7

Example 7 were prepared in the same manner as in Example 6 excluding that the desiccant was applied and the element substrate and the sealing substrate were coupled together in accordance with ODF method. Others were the same as in Example 6.

It is desirable for the desiccant to have a viscosity at ambient temperature of from 0.03 Pa·s to 1 Pa·s for the purpose of performing ODF method. Preferably, the desiccant has viscosity at ambient temperature of from 0.1 Pa·s to 1 Pa·s.

Furthermore, because the sealing substrate and the element substrate were coupled together in a vacuum, it is desirable to employ material of high boiling point such that the desiccant is prevented from vaporization. Preferably, the material has a boiling point of at least 200 Celsius degrees under a reduced pressure of about 300 Pa.

The desiccant of Example 6 in which metal alkoxide was used as the water-trapping agent meets the above requirements, and can be thus applied in accordance with ODF method.

While the embodiments in which the desiccant in accordance with the invention is used with the organic EL element are described above, the desiccant in accordance with the invention can be also used with an organic semiconductor having an organic layer in a hermetically sealed container and a device, such as a solar cell, which is susceptible to moisture.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A desiccant to be disposed in a hermetically sealed container, consisting essentially of
    as a water-trapping agent 50-95% by weight of an organometallic compound having a unit structure as illustrated by Formula 3 based on a total weight of the desiccant, and
    5-50% by weight of silicone as illustrated by Formula 2 based on the total weight of the desiccant, wherein the desiccant includes no organic solvent,

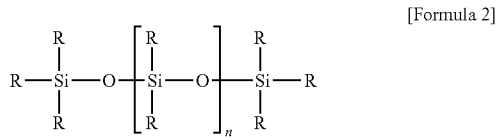

in Formula 3, $R^1$ represents an organic group including alkyl group, aryl group, alkoxy group, cycloalkyl group, heterocyclic group or acyl group having at least one carbon atom, M is a trivalent metal atom, n is an integer of at least one indicating degree of polymerization, and each of $R^1$ may be equal to or different from each other; and in Formula 2 R represents a substituent, n is an integer of at least one indicating degree of polymerization, and each of R may be equal to or different from each other, and wherein the organometallic compound having a unit structure as illustrated by Formula 3 is represented by Formula 8 or Formula 10 illustrated below,

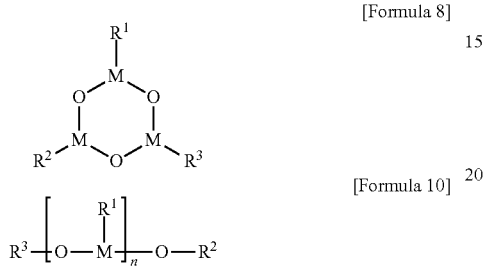

[Formula 8]

[Formula 10]

in Formula 8, each of $R^1$-$R^3$ independently represents an organic group including alkyl group, aryl group, alkoxy group, cycloalkyl group, heterocyclic group or acyl group having at least one carbon atom, and M is a trivalent metal; and in Formula 10, each of $R^1$-$R^3$ independently represents an organic group including alkyl group, aryl group, alkoxy group, cycloalkyl group, heterocyclic group or acyl group having at least one carbon atom, M is a trivalent metal atom, n is an integer of at least one indicating the degree of polymerization, each of $R^1$ may be equal to or different from each other, and the definition of $R^2$ and $R^3$ may be equal to the definition of $R^1$ of Formula 3.

2. An organic EL element having a container, the container comprising:
 an element substrate on which a laminate of a pair of electrodes and an organic layer located between the pair of electrodes is disposed,
 a sealing substrate spaced apart from the element substrate,
 a sealing agent disposed between the element substrate and the sealing substrate thereby hermetically sealing the container, and
 a desiccant as claimed in claim 1 disposed inside the container, wherein the container is filled with the desiccant, and the laminate is surrounded by the desiccant.

\* \* \* \* \*

UNITED STATES PATENT AND TRADEMARK OFFICE
CERTIFICATE OF CORRECTION

PATENT NO. : 9,662,633 B2
APPLICATION NO. : 13/751888
DATED : May 30, 2017
INVENTOR(S) : Yusuke Hoshina et al.

It is certified that error appears in the above-identified patent and that said Letters Patent is hereby corrected as shown below:

In the Specification

Column 10, Line 29: "oxalaeto" should be -- oxalaceto --

Column 10, Line 36: "Rt" should be -- $R^1$ --

Column 20, Line 10: "Pas" should be -- Pa·s --

Column 20, Line 15: "Pa's" should be -- Pa·s --

Column 20, Line 18: "Pa-s" should be -- Pa·s --

Signed and Sealed this
Twenty-second Day of August, 2017

Joseph Matal
*Performing the Functions and Duties of the
Under Secretary of Commerce for Intellectual Property and
Director of the United States Patent and Trademark Office*